(12) United States Patent
Chetput et al.

(10) Patent No.: US 7,260,792 B2
(45) Date of Patent: Aug. 21, 2007

(54) MODELING A MIXED-LANGUAGE MIXED-SIGNAL DESIGN

(75) Inventors: Chandrashekar L. Chetput, Santa Clara, CA (US); Ramesh S. Mayiladuthurai, San Jose, CA (US); Prasenjit Biswas, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 141 days.

(21) Appl. No.: 11/126,497

(22) Filed: May 10, 2005

(65) Prior Publication Data

US 2006/0259879 A1    Nov. 16, 2006

(51) Int. Cl.
*G06F 17/50* (2006.01)

(52) U.S. Cl. ............................................. 716/2; 716/4

(58) Field of Classification Search .................... 716/2, 716/4–5
See application file for complete search history.

(56) References Cited

U.S. PATENT DOCUMENTS 6,813,597 B1 * 11/2004 Demler .................... 703/14
2003/0149962 A1 * 8/2003 Willis et al. ................. 717/135
2003/0154061 A1 * 8/2003 Willis .............................. 703/4
2006/0074626 A1 * 4/2006 Biswas et al. ................... 704/8

OTHER PUBLICATIONS

Accellera, (Jan. 20, 2003). "*Analog & Mixed-Signal Extensions to Verilog HDL*", Accellera Verilog-AMS Language Reference Manual, v.2.1, Table of Contents only, pp. v-xiv.*
IEEE Standard, (Mar. 18, 1999). "*IEEE Standard VHDL Analog and Mixed-Signal Extensions*", IEEE Standard 1076.1-1999, Design Automation Standards Committee of the IEEE Computer Society, Approved Mar. 18, 1999, Table of Contents only, pp. viii-x.*

* cited by examiner

*Primary Examiner*—Paul Dinh
*Assistant Examiner*—Suresh Memula
(74) *Attorney, Agent, or Firm*—Morrison & Foerster LLP (57) ABSTRACT

A method for modeling a mixed-language and mixed-signal (MLMS) design is disclosed. The method includes receiving an MLMS design comprising at least a digital driver, a digital receiver, and an analog block connected by an MLMS net in a hierarchical structure and identifying analog-digital boundaries of the MLMS design. For each analog-digital boundary, the method further includes a) selecting a connect module (CM) by using a predetermined discipline resolution procedure; b) determining input driving values of the CM; and c) connecting the digital driver, the digital receiver, and the analog block to the CM. The method repeats steps a), b), and c) on all analog-digital boundaries of the MLMS design.

13 Claims, 11 Drawing Sheets

MODELING A MIXED-LANGUAGE MIXED-SIGNAL DESIGN

FIELD OF THE INVENTION

The present invention relates to the field of integrated circuit design and verification. In particular, the present invention relates to methods for modeling a mixed-language mixed-signal (MLMS) design.

BACKGROUND OF THE INVENTION

Existing analog and mixed-signal (AMS) electronic design automation (EDA) tools, such as the VHDL-AMS and Verilog-AMS languages, have the capability to work with only pure VHDL-AMS or pure Verilog-AMS designs respectively. A detailed description of working with pure VHDL-AMS designs is found in "IEEE Standard VHDL Analog and Mixed-Signal Extensions," published by IEEE-SA Standards Board on Dec. 23, 1999. A detailed description of working with pure Verilog-AMS designs is found in "Verilog-AMS Language Reference Manual—Analog & Mixed-Signal Extensions to Verilog HDL" (Verilog-AMS LRM) published by Accellera International Inc. on Jan. 20, 2003. However, circuit designers are interested in working with design components from both languages, and do not want to be constrained to either the VHDL-AMS language or the Verilog-AMS language.

Figure 1:
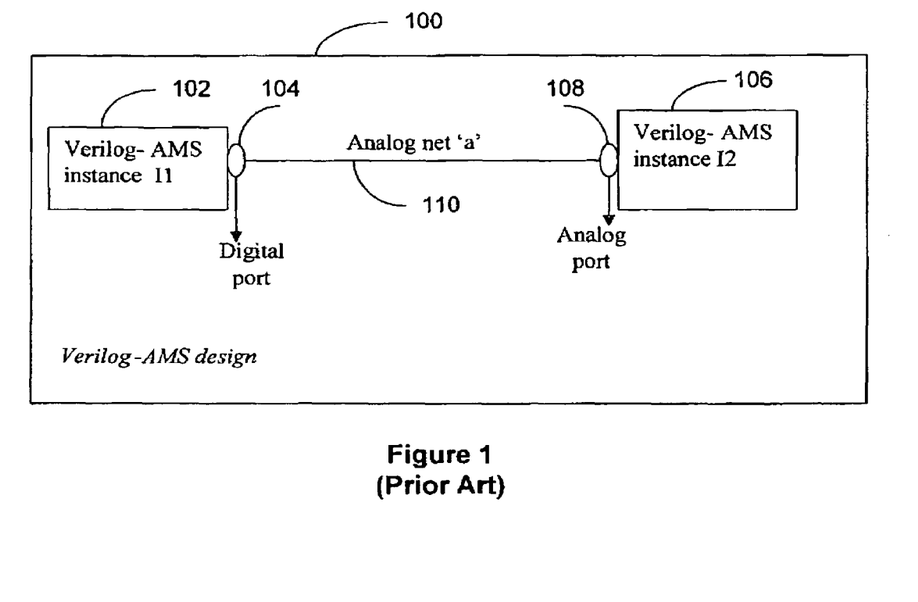
FIG. 1 illustrates an example of a design that consists of digital and analog signal types.

A challenge in a mixed-language mixed-signal design is to integrate design components of different signal types into one common design. FIG. 1 illustrates an example of a design that consists of digital and analog signal types. The top level Verilog-AMS design 100 includes two instances I1 and I2. The instance I1 102 has a digital port 104 while the instance I2 106 has an analog port 108. The top level Verilog-AMS design further includes an analog net 'a' 110, which may be used to connect the ports of instances I1 and I2. However, due to the incompatibility between the digital port 104 and the analog port 108, a mechanism is needed to bridge between the ports of the two instances I1 102 and I2 106.

Figure 2:
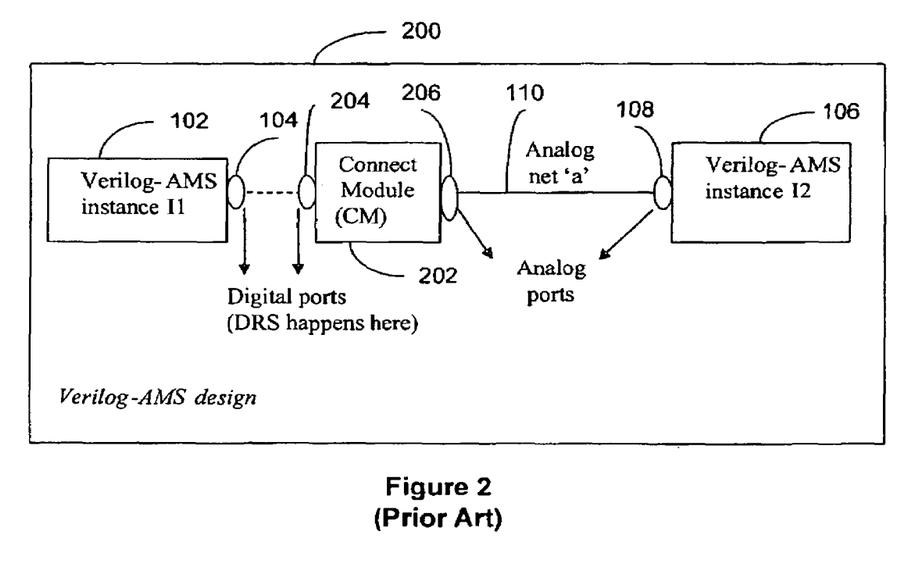
FIG. 2 illustrates a connect module inserted between the two incompatible instances of FIG. 1.

The Verilog-AMS language provides a capability to connect between an analog instance and a digital instance. In order to do so, a connect module (CM) is inserted between the respective ports of the instances either manually by the user or automatically by an analog and mixed-signal EDA tool. FIG. 2 illustrates a connect module inserted between the two incompatible instances of FIG. 1. In addition to the instances I1 102 and I2 106, and their corresponding ports 104 and 108, the top level Verilog-AMS design 200 includes a connect module 202, a digital port 204, and an analog port 206. The analog port 206 is configured to connect to the analog port 108 of the instance I2 108. Upon inserting the connect module 202, the digital drivers from the digital port 104 of instance I1 102 are segregated from the digital receivers of the digital port 104. This approach is referred to as driver-receiver segregation (DRS) or segregating driver and receiver (SDR).

One of the problems in supporting a mixed-language mixed-signal design lies in the lack of compatibility between the VHDL-AMS and Verilog-AMS languages. There are a number of incompatibilities between the Verilog-AMS and VHDL-AMS languages. One such incompatibility is the lack of support for the driver-receiver segregation (DRS) methodology by the VHDL-AMS language. The DRS allows accurate modeling of the effects of analog interconnects on digital signal propagation. As shown in FIG. 2, when an analog net is directly connected to a digital net in a Verilog-AMS design, a connect module (CM) is inserted. The CM includes at least one digital port and one analog port. When the CM is inserted between the analog and digital nets, the digital port of the CM is connected to the digital net and the analog port of the CM is connected to the analog net. In this way, Verilog-AMS ensures that digital nets are always connected to other digital nets only and analog nets are connected to other analog nets only. As a part of this DRS process, the digital drivers are segregated from the digital receivers.

There are a number of approaches utilized to address these issues in an MLMS design. One approach is to create a Verilog-AMS wrapper around the VHDL-AMS block such that the connection between this Verilog-AMS wrapper and the VHDL-AMS block are in the same domain. The DRS is then performed within the Verilog-AMS environment. One drawback of this approach is that the user has to know where such connections exist in a design. In a System-On-a-Chip (SOC) design, there can be thousands of such connections. The wrapper modules need to be created manually or using a wrapper tool like NCShell, developed by Cadence Design Systems, Inc. However, the process of identifying these blocks and implementing the fixes or workarounds for such connections consumes a lot of time and effort.

Another approach is to define the Verilog-AMS net that connects to VHDL-AMS net as a domainless net (i.e. nets without a domain or discipline), then the discipline resolution technique is applied to coerce (force) the Verilog-AMS net to be of the same domain as the VHDL-AMS net. However, this approach does not work if a given Verilog-AMS domainless net is connected to both a VHDL-AMS analog net and a VHDL-AMS digital net.

In addition to the limitations described above, other differences between Verilog-AMS and VHDL-AMS languages also impose challenges in implementing DRS in a mixed-language mixed-signal environment. First, the VHDL-AMS language, being a strongly typed language, does not allow connections between analog and digital nets. However, in a mixed-language mixed-signal design, there is a need to connect Verilog-AMS digital components to VHDL-AMS analog components and vice versa.

Second, Verilog-AMS designs and the VHDL-AMS designs are represented differently. Verilog-AMS designs are represented as flattened designs. On the other hand, VHDL-AMS designs are represented as hierarchical designs.

Third, the Verilog-AMS language and the VHDL-AMS language use different semantics for describing a port direction. As a result, drivers in Verilog-AMS and VHDL-AMS are treated differently. Information about the digital drivers from other hierarchical VHDL-AMS levels may not be available at the same time as those from Verilog-AMS. These differences add to the challenges of implementing DRS in an MLMS design.

In summary, there is a need for using previously designed components from both Verilog-AMS and VHDL-AMS languages and taking advantages of the benefits from both languages. The existing workarounds are inflexible and suffer a number of limitations. Therefore, there is a need for implementing the DRS techniques in an MLMS environment that can provide flexible and automated solutions for integrating design components from both Verilog-AMS and VHDL-AMS languages seamlessly.

SUMMARY

A method for modeling a mixed-language mixed-signal design environment containing VHDL-AMS and Verilog-AMS components is disclosed. The method provides seamless integration of VHDL-AMS and Verilog-AMS design components, and allows designers to use previously designed components from both Verilog-AMS and VHDL-AMS languages and to take advantages of the benefits from both languages.

In one embodiment, a method for modeling a mixed-language and mixed-signal (MLMS) design includes receiving an MLMS design comprising at least a digital driver, a digital receiver, and an analog block connected by an MLMS net in a hierarchical structure, and identifying analog-digital boundaries of the MLMS design. For each analog-digital boundary, the method further includes a) selecting a connect module (CM) by using a predetermined discipline resolution procedure; b) determining input driving values of the CM; and c) connecting the digital driver, the digital receiver, and the analog block to the CM. The method repeats steps a), b), and c) on all analog-digital boundaries of the MLMS design.

In another embodiment, a method for simulating a mixed-language mixed-signal (MLMS) design includes receiving an MLMS design comprising at least a digital driver, a digital receiver, and an analog block connected by an MLMS net in a hierarchical structure, and identifying analog-digital boundaries of the MLMS design. For each analog-digital boundary, the method further includes a) selecting a connect module (CM) by using a predetermined discipline resolution procedure; b) determining input driving values of the CM; and c) connecting the digital driver, the digital receiver, and the analog block to the CM. The method repeats steps a), b), and c) on all analog-digital boundaries of the MLMS design, and simulates the MLMS design using the CM.

BRIEF DESCRIPTION OF THE DRAWINGS

The aforementioned features and advantages of the invention as well as additional features and advantages thereof will be more clearly understood hereinafter as a result of a detailed description of embodiments of the invention in conjunction with the following drawings.

DESCRIPTION OF EMBODIMENTS

Methods are provided for modeling a mixed-language mixed-signal design environment. The following description is presented to enable any person skilled in the art to make and use the invention. Descriptions of specific techniques and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Driver-Receiver Segregation in a Mixed-Language Mixed-Signal Design

Figure 3:
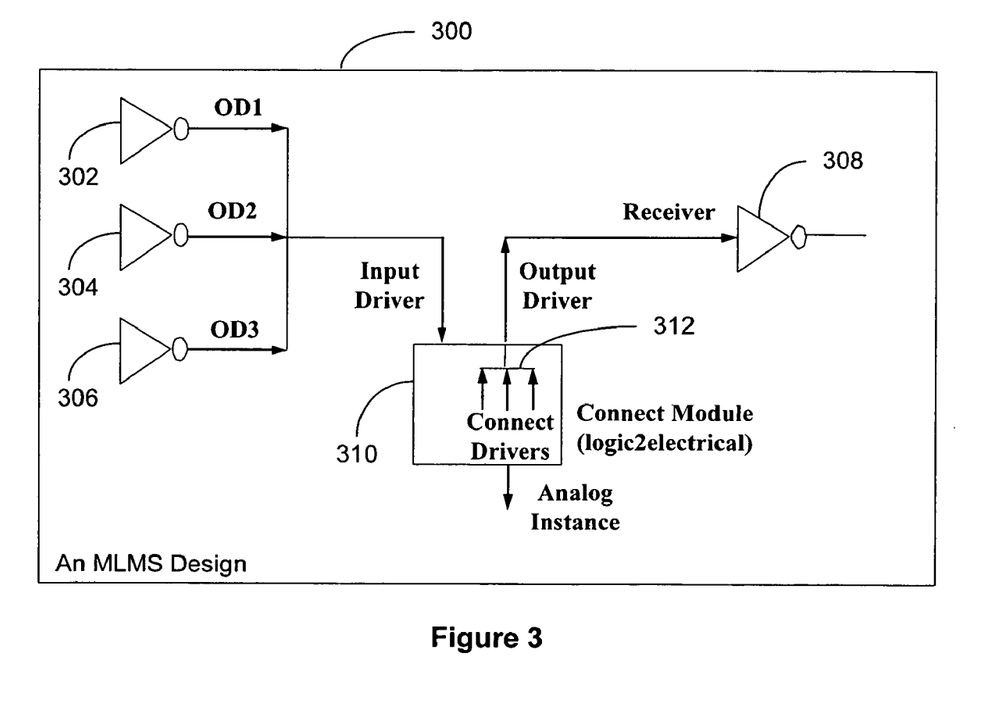
FIG. 3 illustrates a method of applying DRS in an MLMS design.

FIG. 3 illustrates a method of applying DRS in an MLMS design. The MLMS design has a digital port of 'logic' discipline and an analog port of 'electrical' discipline, which are connected together. Based on the direction of the port, a connect module called 'logic2electrical' is inserted between them. As shown in FIG. 3, the top-level Verilog-AMS design 300 includes three digital drivers OD1 302, OD2 304 and OD3 306, a digital receiver 308 and a connect module 310. The digital drivers are of type 'logic', and are referred to as the ordinary drivers (OD). Inside the connect module, there is one or more connect drivers 312. The effect of the DRS is segregating the input digital drivers from the digital receiver.

As shown in FIG. 3, the digital port of the connect module is driven by the original drivers (OD1, OD2 and OD3) and the connect drivers 312 drive the digital net (receiver) connected to the digital port of the connect module 310. The value and delay introduced by connect drivers 312 can be modeled as a function of input drivers with corresponding analog values. This method allows users to model the effect of analog interconnects on digital signal propagation.

In one embodiment, the procedures for performing DRS on an MLMS net connecting Verilog-AMS and VHDL-AMS drivers and receivers (also referred to as DRS procedures) in a hierarchical environment are described as follows:

1. Identify analog-digital boundaries in various segments of the MLMS net.
2. For each analog-digital boundary:
   a) Insert a CM between the identified analog-digital boundaries of the MLMS net. The CM is chosen based on a predefined discipline resolution algorithm. An example of a discipline resolution algorithm is described in U.S. application Ser. No. 10/952,222, entitled "Connecting Verilog-AMS and VHDL-AMS Components in a Mixed-Language Mixed Signal Design," filed on Sep. 27, 2004, which is incorporated herein in its entirety by reference.
   b) Collect all the drivers (also referred to as ordinary drivers) from the digital segment of the net and resolve them to create a resolved input driver. If the digital segment spans across Verilog-AMS and VHDL-AMS languages, then the mixed-language drivers are collected and resolved using mixed-language resolution semantics. This resolved input driver drives the digital port of the CM. A method for resolving digital drivers in a mixed-language environment is described in chapter 10 of "Cadence NC-Verilog Simulator Help", product version 5.4, November, 2004, which is incorporated herein in its entirely by reference.
   c) Collect all the drivers (also referred to as the connect drivers) within the CM that drive the digital port of the CM. Resolve these drivers to create a resolved connect driver. This resolved connect driver will drive the digital receivers (also referred to as 'ordinary receivers'), which are outside the CM. If the digital receivers span across Verilog-AMS and VHDL-AMS languages, then the resolved connect driver is propagated to each of the receivers.
   d) Connect the analog port of CM to the analog segment of the net across which the CM is inserted.

Note that steps 2b and 2c may be performed independent of each other. Also, the steps described above are distinguished from semantics specified in the Verilog-AMS LRM, which the digital drivers and digital receivers are from the Verilog-AMS language only.

The following sections describe applications of performing driver-receiver segregation (DRS) procedures in various exemplary MLMS designs, which contain combinations of drivers and receivers. The drivers may be in the form of Verilog-AMS, VHDL-AMS, or both. The receivers may also be in the form of Verilog-AMS, VHDL-AMS, or both. In the examples illustrated below, the term 'driver' is used to represent a driver on the digital net and the term 'receiver' is used to represent a receiver on the digital net. The resolution of digital drivers across the Verilog-AMS and VHDL-AMS languages are based on the protocols defined by mixed-language networks as described in chapter 10 of "Cadence NC-Verilog Simulator Help", product version 5.4, November, 2004, which is incorporated herein in its entirely by reference. The various cases and protocols for segregating digital drivers from digital receivers in a MLMS design are described below.

Table 1 shows various combinations of VHDL-AMS and Verilog-AMS drivers and receivers in a MLMS design.

TABLE 1

| Drivers | Receivers | | |
| --- | --- | --- | --- |
| | Verilog-AMS receivers only | VHDL-AMS receivers only | Verilog-AMS and VHDL-AMS Receivers |
| Verilog-AMS drivers only | Case 1 | Case 2 | Case 3 |
| VHDL-AMS drivers only | Case 4 | Case 5 | Case 6 |
| Verilog-AMS and VHDL-AMS Drivers | Case 7 | Case 8 | Case 9 |

MLMS Net Containing Only Verilog-AMS Drivers

In one embodiment, an MLMS net containing only Verilog-AMS drivers employs a flattened representation of the drivers and receivers attached to the net. All the drivers on the MLMS net across different levels of the hierarchy are collected and resolved together using the DRS procedures described above. This approach is used because the port direction does not influence the way drivers of a digital net are collected and processed across the hierarchy in Verilog-AMS. Cases 1, 2, and 3 below describe various scenarios where the DRS procedures are performed to segregate drivers and receivers attached to an MLMS net containing only Verilog-AMS drivers.

Case 1: Verilog-AMS Drivers with Verilog-AMS Receivers

Figure 4A:
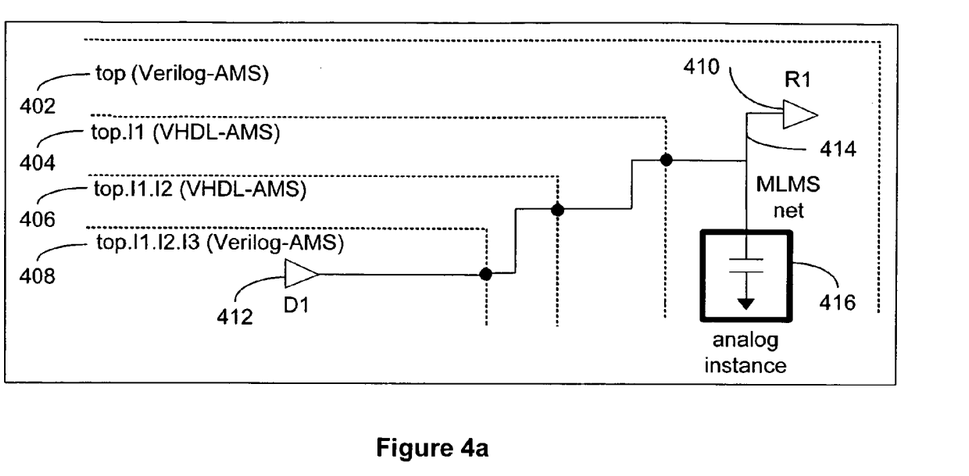
FIG. 4a illustrates a hierarchical design having one or more Verilog-AMS drivers and Verilog-AMS receivers in an MLMS environment.

FIG. 4a illustrates a hierarchical design having one or more Verilog-AMS drivers and Verilog-AMS receivers in an MLMS environment. This scenario is distinguished from a pure Verilog-AMS design. In this case, an MLMS net can pass through VHDL-AMS blocks that do not receive or drive any values on the MLMS net. The hierarchical design may include hierarchical levels from both Verilog-AMS and VHDL-AMS languages. In particular, the hierarchical design includes a top level (Verilog-AMS) 402, a first sub-level top.I1 (VHDL-AMS) 404, a second sub-level top.I1.I2 (VHDL-AMS), and a third sub-level top.I1.I2.I3 (Verilog-AMS). The top level 402 includes a first Verilog-AMS receiver (R1) 410 and the third sub-level top.I1.I2.I3 408 includes a first Verilog-AMS driver (D1) 412. D1 drives R1 through an MLMS net 414, which crosses both the Verilog-AMS and VHDL-AMS language boundaries. An analog instance 416 is attached to the MLMS net at the top level 402. Note that the hierarchical structure may include one or more hierarchical levels, and each hierarchical level may include one or more Verilog-AMS or VHDL-AMS instances.

Figure 4B:
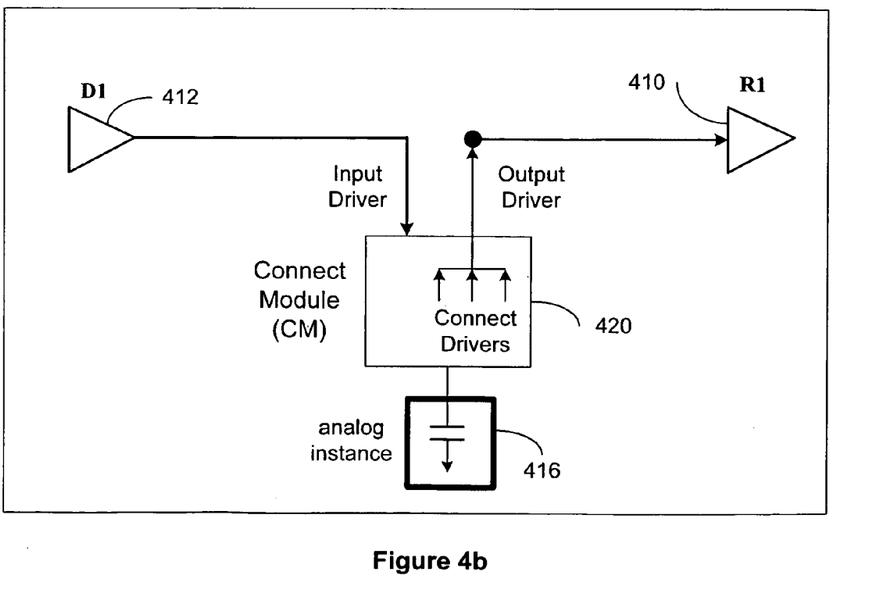
FIG. 4b illustrates a method of performing DRS on the Verilog-AMS drivers and Verilog-AMS receivers of FIG. 4a according to an embodiment of the present invention.

FIG. 4b illustrates a method of performing DRS on the Verilog-AMS drivers and Verilog-AMS receivers of FIG. 4a according to an embodiment of the present invention. A CM 420 is inserted in the top level 402 that segregates the driver D1 412 and the receiver R1 410. The CM 420 acts as a receiver that receives inputs from D1 and drives R1 through a set of connect drivers. In this case, the ordinary driver driving the digital port of the CM is the Verilog-AMS driver D1 412 from top.I1.I2.I3. The connect drivers inside the CM drive the Verilog-AMS receiver R1 410 in the top level. The CM 420 also drives the analog instance 416. After inserting CM 420 in the top module, the R1 410 is segregated from D1 412 of the third sub-level top.I1.I2.I3.

The approach described here for Case 1 also applies when the location of the analog instance is in a different hierarchical location. In other words, the analog instance may be attached to the MLMS net at the top.I1, top.I1.I2, or top.I1.I2.I3 sub-levels. In addition, the drivers and receivers may be located at any sub-level in the hierarchy. Moreover, each level of the hierarchy may be a combination of any number of VHDL-AMS and Verilog-AMS modules. The DRS procedures are performed on the MLMS net while maintaining the original functionality.

Case 2: Verilog-AMS Drivers with VHDL-AMS Receivers

Figure 5A:
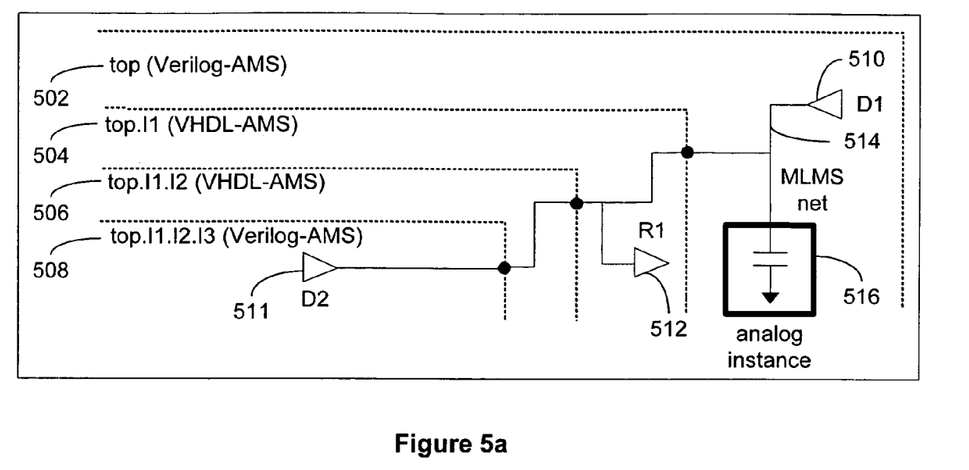
FIG. 5a illustrates a hierarchical design having one or more Verilog-AMS drivers and VHDL-AMS receivers in an MLMS environment.

FIG. 5a illustrates a hierarchical design having one or more Verilog-AMS drivers and VHDL-AMS receivers in an MLMS environment. The hierarchical design includes hierarchical levels from both Verilog-AMS and VHDL-AMS languages. In particular, the hierarchical design includes a top level (Verilog-AMS) 502, a first sub-level top.I1 (VHDL-AMS) 504, a second sub-level top.I1.I2 (VHDL-AMS) 506, and a third sub-level top.I1.I2.I3 (Verilog-AMS) 508. The top level 502 includes a first Verilog-AMS driver (D1) 510, the second sub-level top.I1 includes a first VHDL-AMS receiver (R1) 512, and the third sub-level top.I1.I2.I3 includes a second Verilog-AMS driver (D2) 511. Both D1 and D2 drive R1 through an MLMS net 514, which crosses both the Verilog-AMS and VHDL-AMS language boundaries. An analog instance 516 is attached to the MLMS net at the top level 502.

Figure 5B:
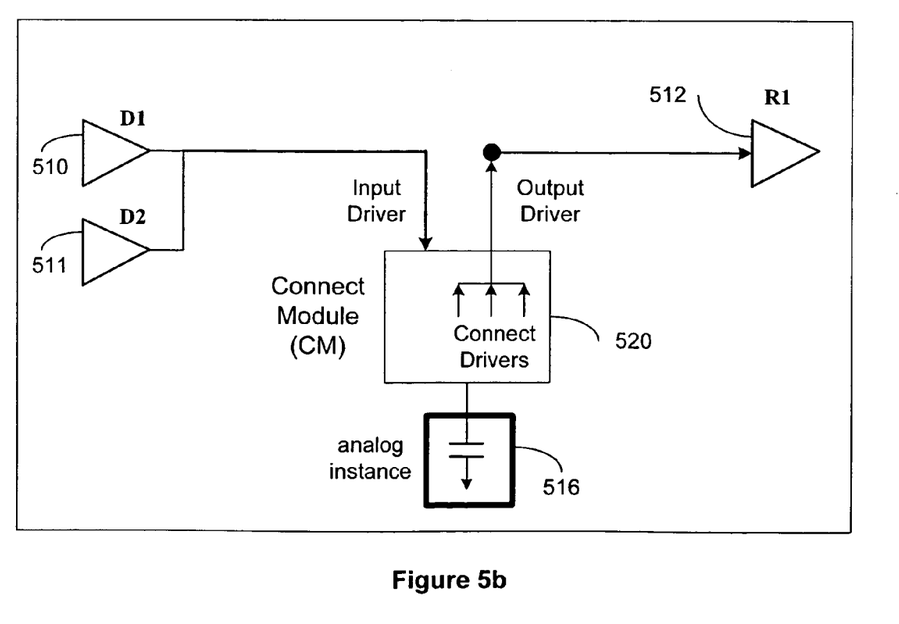
FIG. 5b illustrates a method of performing DRS on the Verilog-AMS drivers and VHDL-AMS receivers of FIG. 5a according to an embodiment of the present invention.

FIG. 5b illustrates a method of performing DRS on the Verilog-AMS drivers and VHDL-AMS receivers of FIG. 5a according to an embodiment of the present invention. A CM 520 is inserted in the top level 502 that segregates the drivers D1 510 and D2 511 from the receiver R1 512. As shown in FIG. 5b, the ordinary drivers driving the digital port of the CM 520 are the Verilog-AMS drivers D1 510 and D2 511 respectively. The connect drivers from inside the CM drive the VHDL-AMS receiver R1 512 in the top.I1 sub-level. The CM 520 also drives the analog instance 516. After inserting CM 520, the R1 512 is segregated from D1 510 of the top level and D2 511 of the sub-level top.I1.I2.I3 respectively.

The approach described here for Case 2 also applies when the location of the analog instance is in a different hierarchical location. In other words, the analog instance may be attached to the MLMS net at the top.I1, top.I1.I2, or top.I1.I2.I3 sub-levels. In addition, the drivers and receivers may be located at any sub-level in the hierarchy. Moreover, each level of the hierarchy may be a combination of any number of VHDL-AMS and Verilog-AMS modules. The DRS procedures are performed on the MLMS net while maintaining the original functionality.

Case 3: Verilog-AMS Drivers with Verilog-AMS and VHDL-AMS Receivers

Figure 6A:
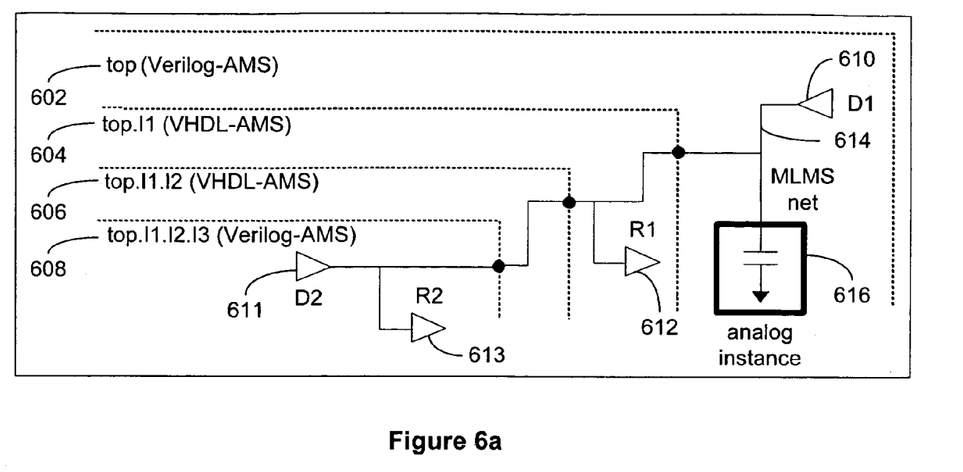
FIG. 6a illustrates a hierarchical design having one or more Verilog-AMS drivers and Verilog-AMS and VHDL-AMS receivers in an MLMS environment.

FIG. 6a illustrates a hierarchical design having one or more Verilog-AMS drivers and Verilog-AMS and VHDL-AMS receivers in an MLMS environment. The hierarchical design includes hierarchical levels from both Verilog-AMS and VHDL-AMS languages. In particular, the hierarchical design includes a top level (Verilog-AMS) 602, a first sub-level top.I1 (VHDL-AMS) 604, a second sub-level top.I1.I2 (VHDL-AMS) 606, and a third sub-level top.I1.I2.I3 (Verilog-AMS) 608. The top level 602 includes a first Verilog-AMS driver (D1) 610, the first sub-level top.I1 includes a first VHDL-AMS receiver (R1) 612, and the third sub-level top.I1.I2.I3 includes a second Verilog-AMS driver (D2) 611 and a second Verilog-AMS receiver (R2) 613. Both D1 and D2 drive R1 and R2 through an MLMS net 614, which crosses both the Verilog-AMS and VHDL-AMS language boundaries. An analog instance 616 is attached to the MLMS net at the top level 602.

Figure 6B:
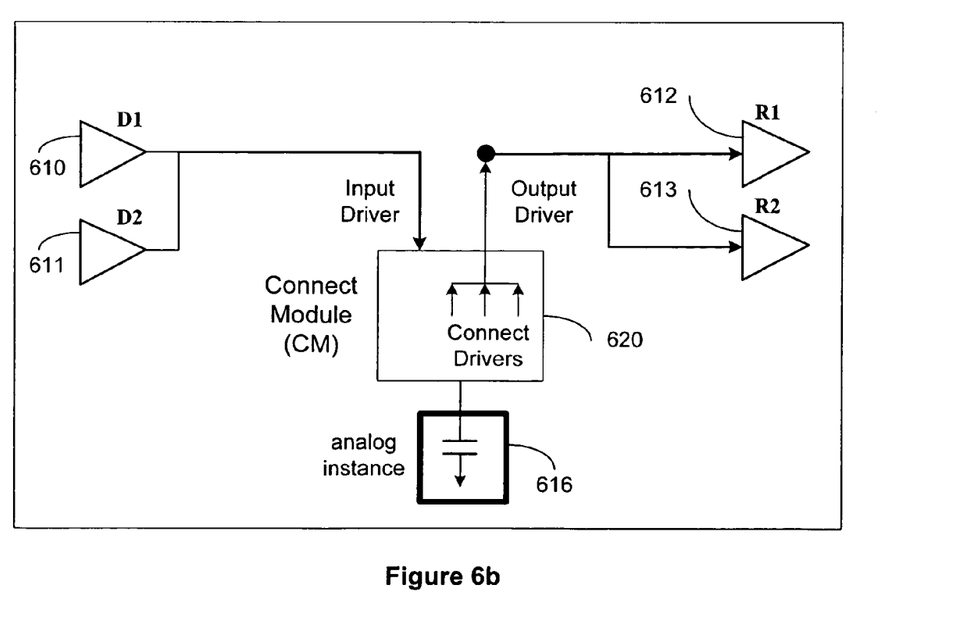
FIG. 6b illustrates a method of performing DRS on the Verilog-AMS drivers and Verilog-AMS and VHDL-AMS receivers of FIG. 6a according to an embodiment of the present invention.

FIG. 6b illustrates a method of performing DRS on the Verilog-AMS drivers and Verilog-AMS and VHDL-AMS receivers of FIG. 6a according to an embodiment of the present invention. A CM 620 is inserted in the top level 602 that segregates the drivers D1 610 and D2 611 from the receivers R1 612 and R2 613. As shown in FIG. 6b, the ordinary drivers that drive the digital port of the CM 620 are the Verilog-AMS drivers D1 and D2 from the top level and the top.I1.I2.I3 sub-level. The connect drivers inside the CM 620 drive both the VHDL-AMS receiver R1 in the top.I1 sub-level and the Verilog-AMS receiver R2 in the top.I1.I2.I3 sub-level. The CM 620 also drives the analog instance 616. After inserting CM 620, the receivers R1 612 and R2 613 are segregated from drivers D1 610 and D2 611 respectively.

The approach described here for Case 3 also applies when the location of the analog instance is in a different hierarchical location. In other words, the analog instance may be attached to the MLMS net at the top.I1, top.I1.I2, or top.I1.I2.I13 sub-levels. In addition, the drivers and receivers may be located at any sub-level in the hierarchy. Moreover, each level of the hierarchy may be a combination of any number of VHDL-AMS and Verilog-AMS modules. The DRS procedures are performed on the MLMS net while maintaining the original functionality.

As shown in cases 1, 2, and 3, an MLMS net containing only Verilog-AMS drivers is represented as a flattened digital network and the DRS procedures are performed on the flattened digital network to accurately segregate the MLMS design. Note that although the CM is inserted in the Verilog-AMS block, the receivers embedded within the VHDL-AMS blocks are also affected by the DRS procedures.

MLMS Net Containing Only VHDL-AMS Drivers

In another embodiment, an MLMS net containing only VHDL-AMS drivers is represented as a hierarchical digital network as illustrated in cases 4, 5, and 6 below. The digital drivers on each digital segment of the MLMS net are resolved within each level, since the VHDL-AMS semantics require driver resolution to be performed at every hierarchical level (as opposed to be performed in a flattened level with Verilog-AMS). The port direction is used in determining the way drivers of a digital net are collected and processed across the hierarchy. In addition, the resolved driver is propagated to the adjacent levels as appropriate. Cases 4, 5, and 6 below describe various scenarios where the DRS procedures are performed to segregate drivers and receivers attached to an MLMS net containing only VHDL-AMS drivers.

Case 4: VHDL-AMS Drivers with Verilog-AMS Receivers

Figure 7A:
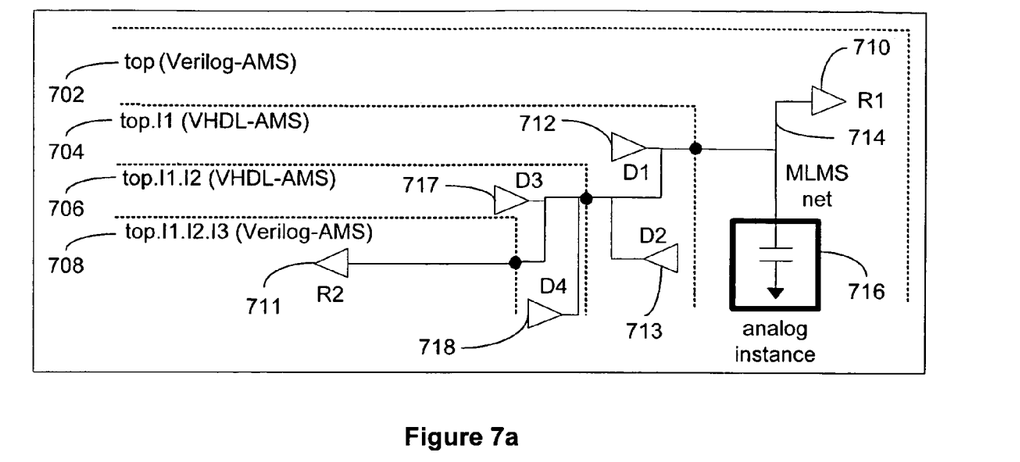
FIG. 7a illustrates a hierarchical design having one or more VHDL-AMS drivers and Verilog-AMS receivers in an MLMS environment.

FIG. 7a illustrates a hierarchical design having one or more VHDL-AMS drivers and Verilog-AMS receivers in an MLMS environment. The hierarchical design includes hierarchical levels from both Verilog-AMS and VHDL-AMS languages. In particular, the hierarchical design includes a top level (Verilog-AMS) 702, a first sub-level top.I1 (VHDL-AMS) 704, a second sub-level top.I1.I2 (VHDL-AMS) 706, and a third sub-level top.I1.I2.I3 (Verilog-AMS) 708. The top level 702 includes a first Verilog-AMS receiver (R1) 710, the first sub-level top.I1 includes a first VHDL-AMS driver (D1) 712 and a second VHDL-AMS driver (D2) 713, the second sub-level top.I1.I2 includes a third VHDL-AMS driver (D3) 717 and a fourth VHDL-AMS driver (D4) 718, and the third sub-level top.I1.I2.I3 includes a second Verilog-AMS receiver (R2) 711. The drivers D1, D2, D3, and D4 drive R1 and R2 through an MLMS net 714, which crosses both the Verilog-AMS and VHDL-AMS language boundaries. An analog instance 716 is attached to the MLMS net at the top level 702.

Figure 7B:
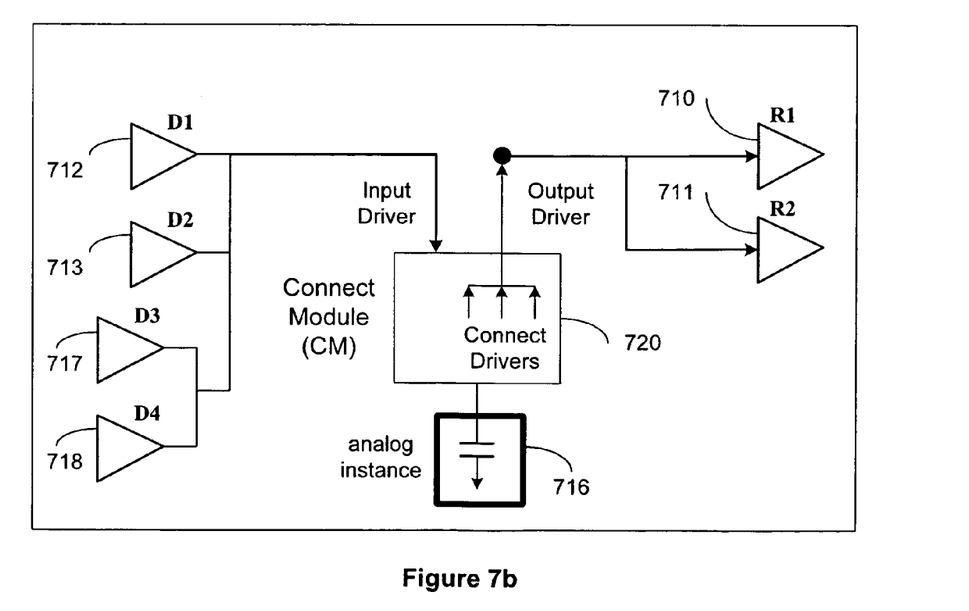
FIG. 7b illustrates a method of performing DRS on the VHDL-AMS drivers and Verilog-AMS receivers of FIG. 7a according to an embodiment of the present invention.

FIG. 7b illustrates a method of performing DRS on the VHDL-AMS drivers and Verilog-AMS receivers of FIG. 7a according to an embodiment of the present invention. A connect module (CM) 720 is inserted in the top level 702 that segregates the drivers D1 712, D2 713, D3 717, and D4 718 from the receivers R1 710 and R2 711. In this case, if the DRS procedures are performed in strict Verilog-AMS terms, the ordinary drivers seen by the CM 720 need to contain all VHDL-AMS drivers D1, D2, D3 and D4. On the other hand, in VHDL-AMS semantics, the value of input drivers is resolved in a hierarchical fashion, i.e., sub-level top.I1 that contains D1 and D2 are resolved first, then sub-level top.I1.I2 that contains D3 and D4 is resolved:

((D3+D4)+D1+D2). //VHDL-AMS way of computation

Note that if the design is converted to a pure Verilog-AMS design, then the value of the input drivers is resolved as a flattened design:

(D1+D2+D3+D4). //Verilog-AMS way of computation

The value of input drivers obtained using the above two methods yield the same result if the VHDL-AMS signals use the 'STD_LOGIC' or 'STD_ULOGIC' types.

The resolved value of the input drivers from both the VHDL-AMS and Verilog-AMS approaches in this example are the same due to the commutative nature of the resolution semantics used by both the languages. However, the two approaches may yield different results if the VHDL-AMS hierarchy includes signals declared with other complex signal types. Note that the DRS procedures in this case do not change the VHDL-AMS digital network resolution semantics. Thus, if the ordinary drivers are all from the VHDL-AMS language, they are resolved hierarchically as explained above.

The resolved VHDL-AMS drivers from the top.I1 level and the top.I1.I2 level drive the digital port of the CM 720. The connect drivers inside the CM drive the Verilog-AMS receivers R1 710 in top level and R2 in the top.I1.I2.I3 sub-level. The CM 720 also drives the analog instance 716. After inserting CM 720, the receivers R1 710 and R2 711 are segregated from drivers D1 712, D2 713, D3 717, and D4 718.

The approach described here for Case 4 also applies when the location of the analog instance is in a different hierarchical location. In other words, the analog instance may be attached to the MLMS net at the top.I1, top.I1.I2, or top.I1.I2.I3 sub-levels. In addition, the drivers and receivers may be located at any sub-level in the hierarchy. Moreover, each level of the hierarchy may be a combination of any number of VHDL-AMS and Verilog-AMS modules. The DRS procedures are performed on the MLMS net while maintaining the original functionality.

Case 5: VHDL-AMS Drivers with VHDL-AMS Receivers

Figure 8A:
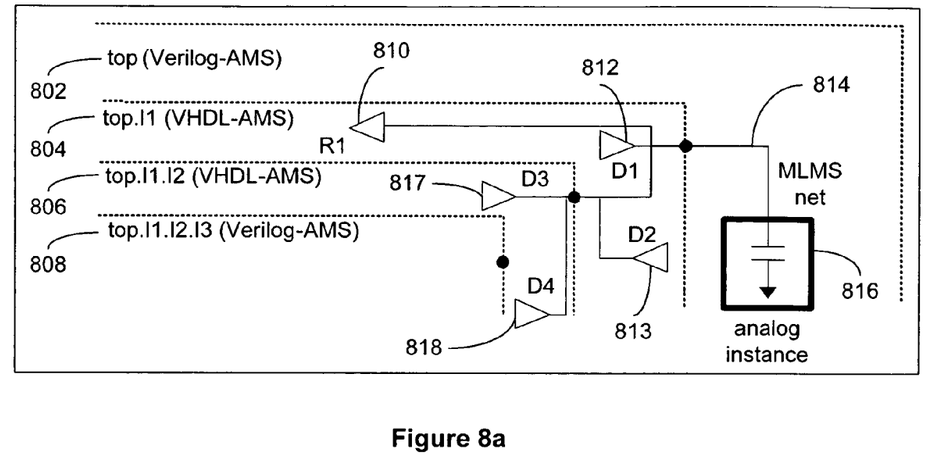
FIG. 8a illustrates a hierarchical design having one or more VHDL-AMS drivers and VHDL-AMS receivers in an MLMS environment.

FIG. 8a illustrates a hierarchical design having one or more VHDL-AMS drivers and VHDL-AMS receivers in an MLMS environment. The hierarchical design includes hierarchical levels from both Verilog-AMS and VHDL-AMS languages. In particular, the hierarchical design includes a top level (Verilog-AMS) 802, a first sub-level top.I1 (VHDL-AMS) 804, a second sub-level top.I1.I2 (VHDL-AMS) 806, and a third sub-level top.I1.I2.I3 (Verilog-AMS) 808. The first sub-level top.I1 includes a first VHDL-AMS driver (D1) 812 and a second VHDL-AMS driver (D2) 813 and a VHDL-AMS receiver (R1) 810, the second sub-level top.I1.I2 includes a third VHDL-AMS driver (D3) 817 and a fourth VHDL-AMS driver (D4) 818. The drivers D1, D2, D3, and D4 drive R1 through an MLMS net 814, which crosses both the Verilog-AMS and VHDL-AMS language boundaries. An analog instance 816 is attached to the MLMS net at the top level 802.

Figure 8B:
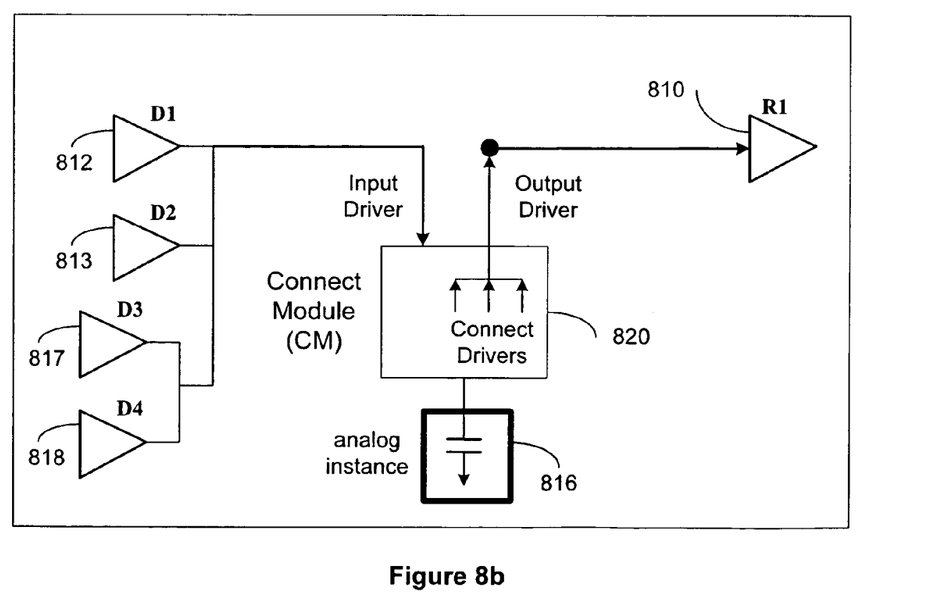
FIG. 8b illustrates a method of performing DRS on the VHDL-AMS drivers and VHDL-AMS receivers of FIG. 8a according to an embodiment of the present invention.

FIG. 8b illustrates a method of performing DRS on the VHDL-AMS drivers and VHDL-AMS receivers of FIG. 8a according to an embodiment of the present invention. A CM 820 is inserted in the top level 802 that segregates the drivers D1 812, D2 813, D3 817, and D4 818 from the receivers R1 810. Similar to case 4, the value of input drivers is resolved in a hierarchical fashion. In this example, the resolved VHDL-AMS drivers D1 and D2 from the top.I1 sub-level and D3 and D4 from the top.I1.I2 sub-level drive the digital port of the CM 820. The connect drivers inside the CM drives the VHDL-AMS receiver R1 810 in the top.I1 sub-level. The CM 820 also drives the analog instance 816. After inserting CM 820, the receivers R1 810 is segregated from drivers D1 812, D2 813, D3 817, and D4 818.

The approach described here for Case 5 also applies when the location of the analog instance is in a different hierarchical location. In other words, the analog instance may be attached to the MLMS net at the top.I1, top.I1.I2, or top.I1.I2.I3 sub-levels. In addition, the drivers and receivers may be located at any sub-level in the hierarchy. Moreover, each level of the hierarchy may be a combination of any number of VHDL-AMS and Verilog-AMS modules. The DRS procedures are performed on the MLMS net while maintaining the original functionality.

Case 6: VHDL-AMS Drivers with VHDL-AMS Receiver and Verilog-AMS Receiver.

Figure 9A:
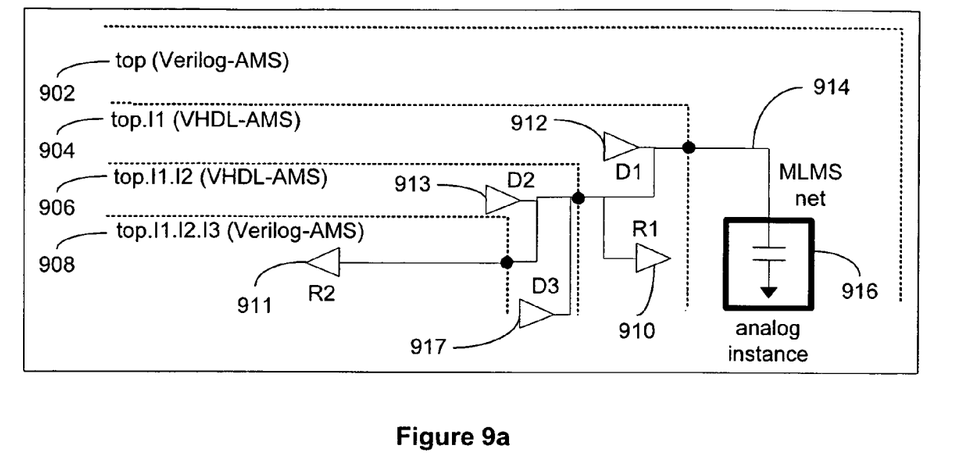
FIG. 9a illustrates a hierarchical design having one or more VHDL-AMS drivers and VHDL-AMS and Verilog-AMS receivers in an MLMS environment.

FIG. 9a illustrates a hierarchical design having one or more VHDL-AMS drivers and VHDL-AMS and Verilog-AMS receivers in an MLMS environment. The hierarchical design includes hierarchical levels from both Verilog-AMS and VHDL-AMS languages. In particular, the hierarchical design includes a top level (Verilog-AMS) 902, a first sub-level top.I1 (VHDL-AMS) 904, a second sub-level top.I1.I2 (VHDL-AMS) 906, and a third sub-level top.I1.I2.I3 (Verilog-AMS) 908. The first sub-level top.I1 includes a first VHDL-AMS driver (D1) 912 and a first VHDL-AMS receiver (R1) 910, the second sub-level top.I1.I2 includes a second VHDL-AMS driver (D2) 913 and a third VHDL-AMS driver (D3) 917, and the third sub-level top.I1.I2.I3 includes a second Verilog-AMS receiver (R2) 911. The drivers D1, D2, and D3 drive R1 and R2 through an MLMS net 914, which crosses both the Verilog-AMS and VHDL-AMS language boundaries. An analog instance 916 is attached to the MLMS net at the top level 902.

Figure 9B:
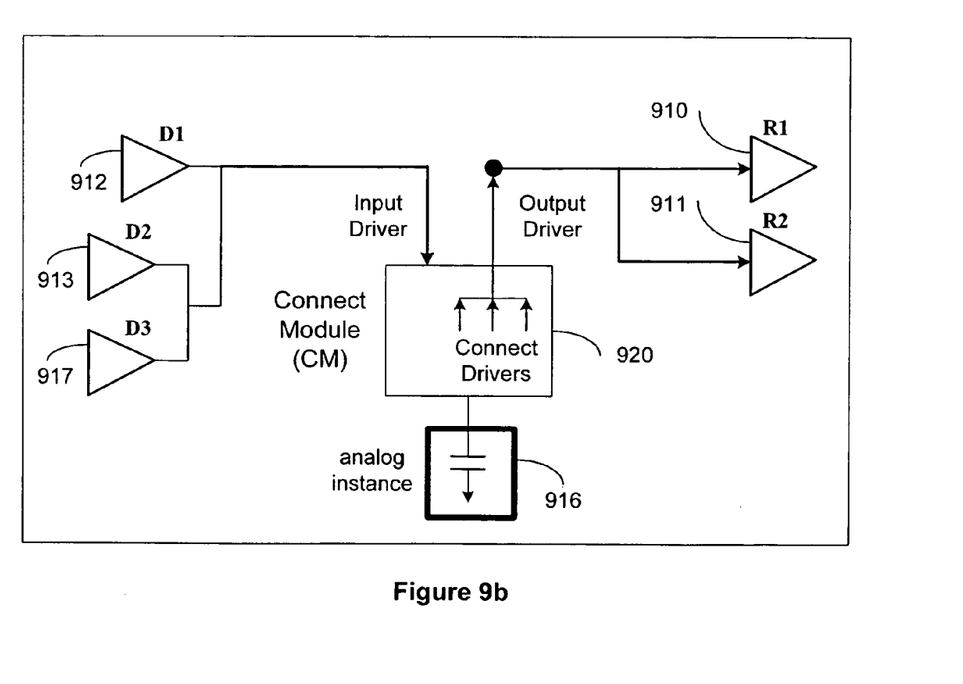
FIG. 9b illustrates a method of performing DRS on the VHDL-AMS drivers and VHDL-AMS and Verilog-AMS receivers of FIG. 9a according to an embodiment of the present invention.

FIG. 9b illustrates a method of performing DRS on the VHDL-AMS drivers and VHDL-AMS and Verilog-AMS receivers of FIG. 9a according to an embodiment of the present invention. Case 6 is a combination of cases 4 and 5. Similar to cases 4 and 5, the value of input drivers is resolved level-by-level in a hierarchical fashion. A CM 920 is inserted in the top level 902 that segregates the drivers D1 912, D2 913, and D3 917 from the receivers R1 910 and R2 911. The CM 920 acts as a receiver that receives inputs from drivers D1, D2, and D3; and drives R1 and R2 through a set of connect drivers. The CM 920 also drives the analog instance 916. After inserting CM 920, the receivers R1 910 and R2 911 are segregated from drivers D1 912, D2 913, and D3 917.

The approach described here for Case 6 also applies when the location of the analog instance is in a different hierarchical location. In other words, the analog instance may be attached to the MLMS net at the top.I1, top.I1.I2, or top.I1.I2.I3 sub-levels. In addition, the drivers and receivers may be located at any sub-level in the hierarchy. Moreover, each level of the hierarchy may be a combination of any number of VHDL-AMS and Verilog-AMS modules. The DRS procedures are performed on the MLMS net while maintaining the original functionality.

MLMS Net Containing Both Verilog-AMS and VHDL-AMS Drivers

In yet another embodiment, an MLMS net that is driven by drivers from both Verilog-AMS and VHDL-AMS languages is represented as a flattened digital network based on mixed-language network semantics. All the drivers on the MLMS net across different levels of the hierarchy are collected and resolved together using the DRS procedures described above. This approach is used because the port direction does not influence the way drivers of a digital net are collected and processed across the hierarchy in Verilog-AMS. Cases 7, 8, and 9 illustrate examples where the DRS procedures are performed to segregate drivers from both Verilog-AMS and VHDL-AMS languages and receivers attached to an MLMS net containing both Verilog-AMS and VHDL-AMS drivers.

Case 7: Drivers From Verilog-AMS and VHDL-AMS with Verilog-AMS Receivers

Figure 10A:
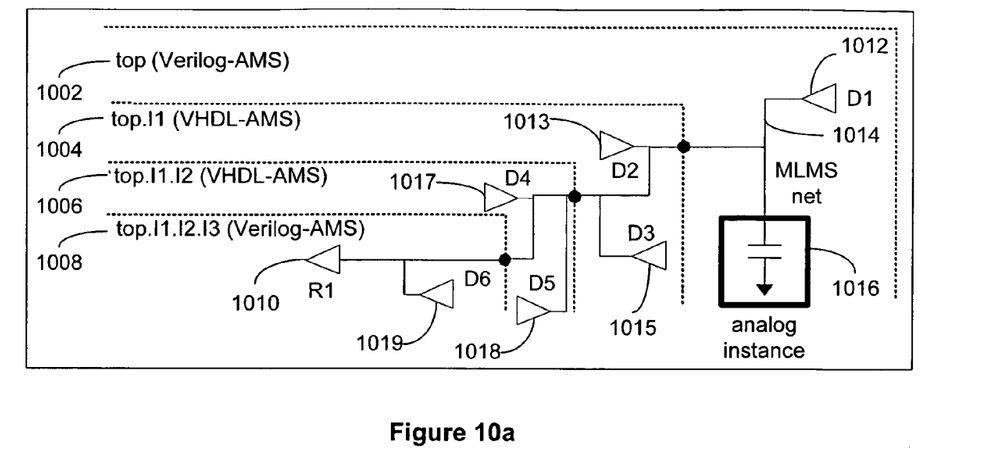
FIG. 10a illustrates a hierarchical design having one or more VHDL-AMS and Verilog-AMS drivers and Verilog-AMS receivers in an MLMS environment.

FIG. 10a illustrates a hierarchical design having one or more VHDL-AMS and Verilog-AMS drivers and Verilog-AMS receivers in an MLMS environment. The hierarchical design includes hierarchical levels from both Verilog-AMS and VHDL-AMS languages. In particular, the hierarchical design includes a top level (Verilog-AMS) 1002, a first sub-level top.I1 (VHDL-AMS) 1004, a second sub-level top.I1.I2 (VHDL-AMS) 1006, and a third sub-level top.I1.I2.I3 (Verilog-AMS) 1008. The top level includes a first Verilog-AMS driver (D1) 1012, the first sub-level top.I1 includes a second VHDL-AMS driver (D2) 1013 and a third VHDL-AMS driver (D3) 1015, the second sub-level top.I1.I2 includes a fourth VHDL-AMS driver (D4) 1017 and a fifth VHDL-AMS driver (D5) 1018, and the third sub-level top.I1.I2.I3 includes a first Verilog-AMS receiver (R1) 1010 and a sixth Verilog-AMS driver (D6) 1019. The drivers D1, D2, D3, D4, D5 and D6 drive R1 through an MLMS net 1014, which crosses both the Verilog-AMS and VHDL-AMS language boundaries. An analog instance 1016 is attached to the MLMS net at the top level 1002.

Figure 10B:
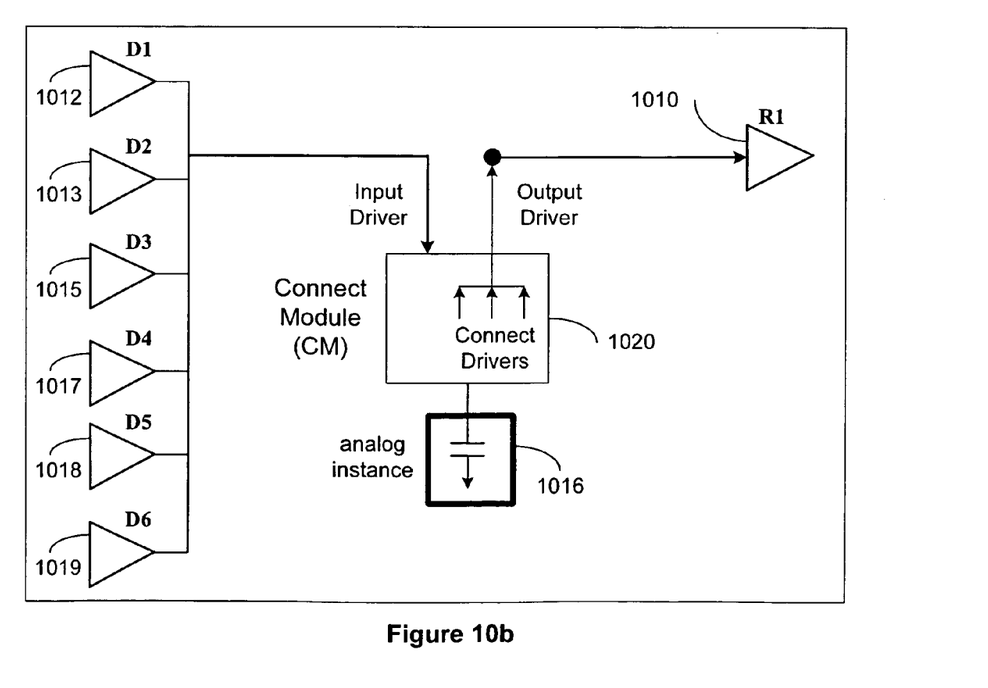
FIG. 10b illustrates a method of performing DRS on the VHDL-AMS drivers and VHDL-AMS receivers of FIG. 10a according to an embodiment of the present invention.

FIG. 10b illustrates a method of performing DRS on the VHDL-AMS drivers and VHDL-AMS receivers of FIG. 10a according to an embodiment of the present invention. A flattened digital network representation is used in this case to resolve the drivers across the hierarchy. Their resolved values are used to drive the digital port of the CM. The Verilog-AMS receiver receives the value driven by the connect drivers from inside the CM. Note that the presence of a single Verilog-AMS driver has resulted in a flattened digital network representation for this net. So, in this case the ordinary drivers seen by CM (inserted in the top level Verilog-AMS block) are computed as (D1+D2+D3+D4+D5+D6). Note that the VHDL-AMS drivers (D1, D2, D3, D4, D5, D6) are being computed in a flattened manner due to presence of both Verilog-AMS and VHDL-AMS drivers on the MLMS net.

A CM 1020 is inserted in the top level 1002 that segregates the drivers D1 1012, D2 1013, D3 1015, D4 1017, D5 1018, and D6 1019 from the receiver R1 1010. The CM 1020 also drives the analog instance 1016. After inserting CM 1020, the receiver R1 1010 is segregated from drivers D1 1012, D2 1013, D3 1015, D4 1017, D5 1018, and D6 1019.

The approach described here for Case 7 also applies when the location of the analog instance is in a different hierarchical location. In other words, the analog instance may be attached to the MLMS net at the top.I1, top.I1.I2, or top.I1.I2.I3 sub-levels. In addition, the drivers and receivers may be located at any sub-level in the hierarchy. Moreover, each level of the hierarchy may be a combination of any number of VHDL-AMS and Verilog-AMS modules. The DRS procedures are performed on the MLMS net while maintaining the original functionality.

Case 8: Verilog-AMS and VHDL-AMS Drivers with VHDL-AMS Receivers

Figure 11A:
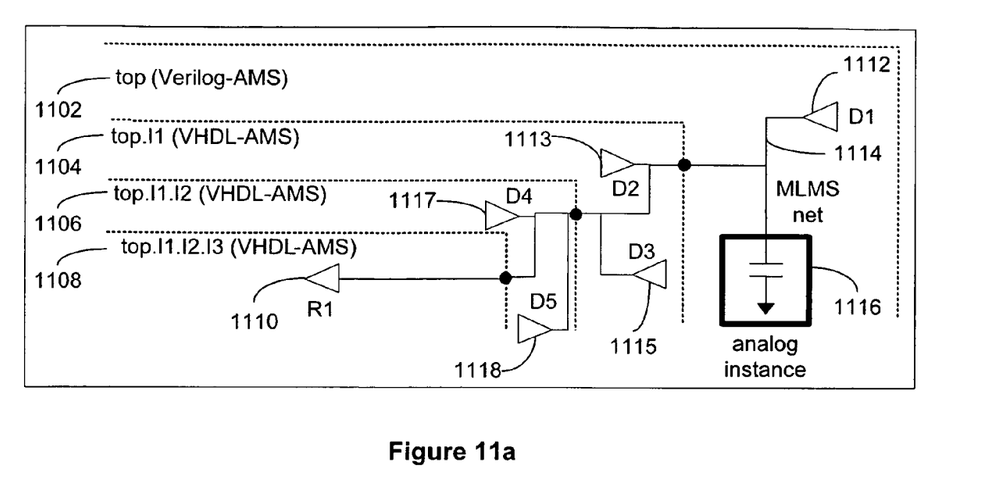
FIG. 11a illustrates a hierarchical design having one or more VHDL-AMS and Verilog-AMS drivers and VHDL-AMS receivers in an MLMS environment.

FIG. 11a illustrates a hierarchical design having one or more VHDL-AMS and Verilog-AMS drivers and VHDL-AMS receivers in an MLMS environment. The hierarchical design includes hierarchical levels from both Verilog-AMS and VHDL-AMS languages. In particular, the hierarchical design includes a top level (Verilog-AMS) 1102, a first sub-level top.I1 (VHDL-AMS) 1104, a second sub-level top.I1.I2 (VHDL-AMS) 1106, and a third sub-level top.I1.I2.I3 (VHDL-AMS) 1108. The top level includes a first Verilog-AMS driver (D1) 1112, the first sub-level top.I1 includes a second VHDL-AMS driver (D2) 1113 and a third VHDL-AMS driver (D3) 1115, the second sub-level top.I1.I2 includes a fourth VHDL-AMS driver (D4) 1117 and a fifth VHDL-AMS driver (D5) 1118, and the third sub-level top.I1.I2.I3 includes a first VHDL-AMS receiver (R1) 1110. The drivers D1, D2, D3, D4, and D5 drive R1 through an MLMS net 1114, which crosses both the Verilog-AMS and VHDL-AMS language boundaries. An analog instance 1116 is attached to the MLMS net at the top level 1102.

Figure 11B:
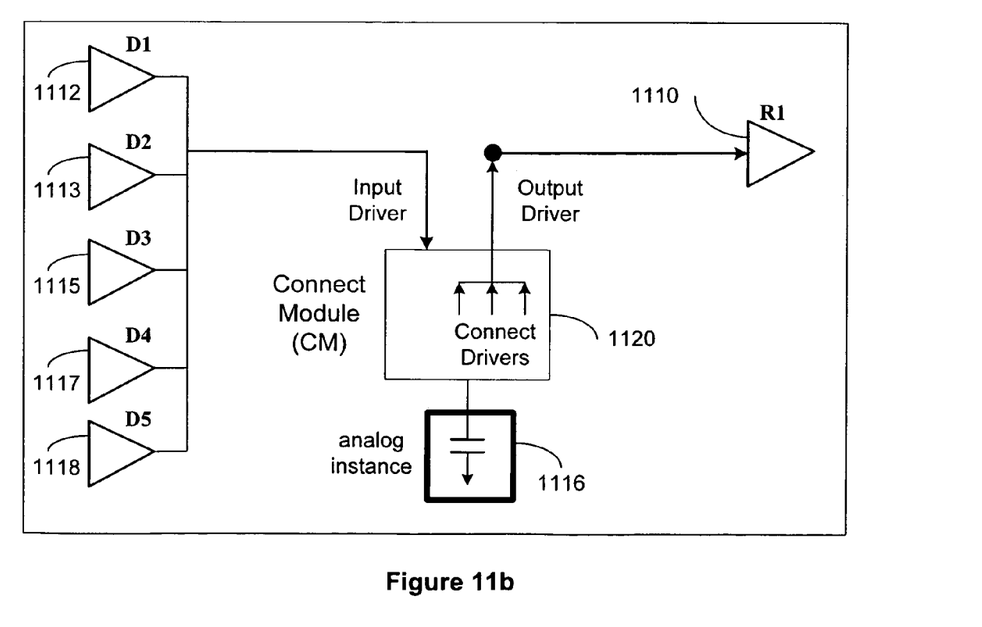
FIG. 11b illustrates a method of performing DRS on the VHDL-AMS and Verilog-AMS drivers and VHDL-AMS receivers of FIG. 11a according to an embodiment of the present invention.

FIG. 11b illustrates a method of performing DRS on the VHDL-AMS and Verilog-AMS drivers and VHDL-AMS receivers of FIG. 11a according to an embodiment of the present invention. A CM 1120 is inserted in the top level 1102 that segregates the drivers D1 1112, D2 1113, D3 1115, D4 1117, and D5 1118 from the receiver R1 1010. The CM 1120 acts as a receiver that receives inputs from drivers D1, D2, D3, D4, and D5; and drives R1 through a set of connect drivers. The CM 1120 also drives the analog instance 1116. After inserting CM 1120, the receiver R1 1110 is segregated from drivers D1 1112, D2 1113, D3 1115, D4 1117, and D5 1118.

The VHDL-AMS receiver receives the value driven by the connect drivers inside the CM. All the ordinary drivers (VHDL-AMS as well as Verilog-AMS) are resolved together and their resolved value drives the digital port of the CM.

The approach described here for Case 8 also applies when the location of the analog instance is in a different hierarchical location. In other words, the analog instance may be attached to the MLMS net at the top.I1, top.I1.I2, or top.I1.I2.I3 sub-levels. In addition, the drivers and receivers may be located at any sub-level in the hierarchy. Moreover, each level of the hierarchy may be a combination of any number of VHDL-AMS and Verilog-AMS modules. The DRS procedures are performed on the MLMS net while maintaining the original functionality.

Figure 12A:
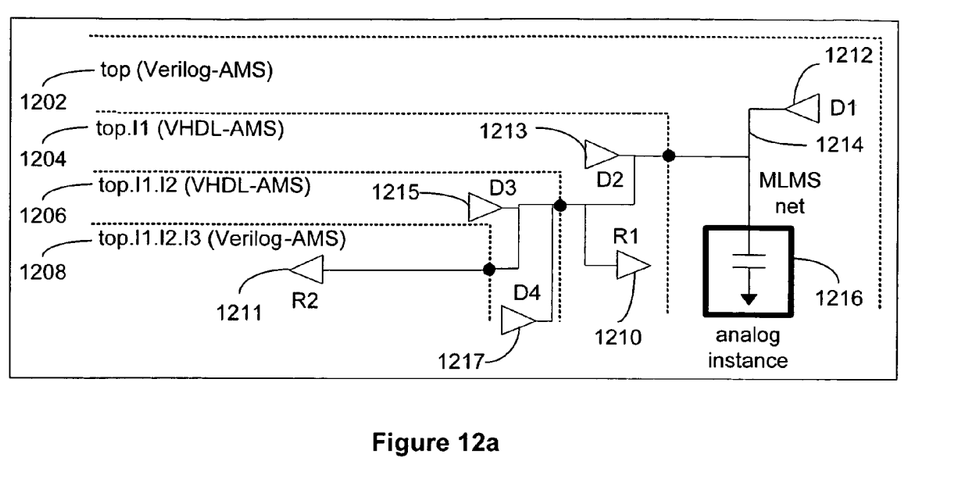
FIG. 12a illustrates a hierarchical design having one or more VHDL-AMS and Verilog-AMS drivers and VHDL-AMS and Verilog-AMS receivers in an MLMS environment.

Case 9: Verilog-AMS and VHDL-AMS Drivers with Verilog-AMS and VHDL-AMS Receivers FIG. 12a illustrates a hierarchical design having one or more VHDL-AMS and Verilog-AMS drivers and VHDL-AMS and Verilog-AMS receivers in an MLMS environment. The hierarchical design includes hierarchical levels from both Verilog-AMS and VHDL-AMS languages. In particular, the hierarchical design includes a top level (Verilog-AMS) 1202, a first sub-level top.I1 (VHDL-AMS) 1204, a second sub-level top.I1.I2 (VHDL-AMS) 1206, and a third sub-level top.I1.I2.I3 (Verilog-AMS) 1208. The top level includes a first Verilog-AMS driver (D1) 1212, the first sub-level top.I1 includes a second VHDL-AMS driver (D2) 1213 and a first VHDL-AMS receiver (R1) 1210, the second sub-level top.I1.I2 includes a third VHDL-AMS driver (D3) 1215 and a fourth VHDL-AMS driver (D4) 1217, and the third sub-level top.I1.I2.I3 includes a second Verilog-AMS receiver (R2) 1211. The drivers D1, D2, D3, and D4 drive R1 and R2 through an MLMS net 1214, which crosses both the Verilog-AMS and VHDL-AMS language boundaries. An analog instance 1216 is attached to the MLMS net at the top level 1202.

Figure 12B:
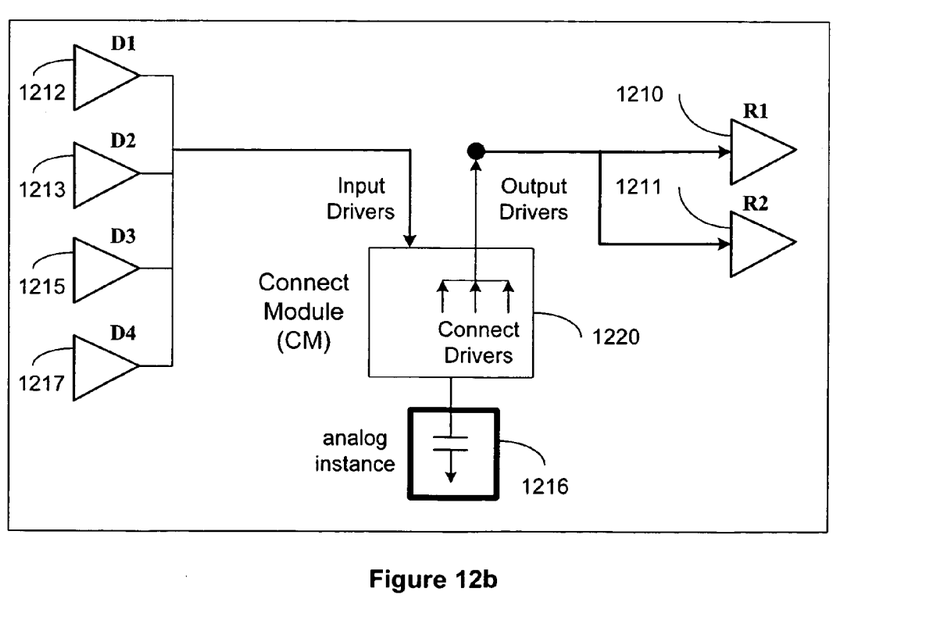
FIG. 12b illustrates a method of performing DRS on the VHDL-AMS and Verilog-AMS drivers and the VHDL-AMS and Verilog-AMS receivers of FIG. 12a according to an embodiment of the present invention.

FIG. 12b illustrates a method of performing DRS on the VHDL-AMS and Verilog-AMS drivers and the VHDL-AMS and Verilog-AMS receivers of FIG. 12a according to an embodiment of the present invention. A CM 1220 is inserted in the top level 1202 that segregates the drivers D1 1212, D2 1213, D3 1115, and D4 1117 from the receivers R1 1210 and R2 1211. The CM 1220 acts as a receiver that receives inputs from drivers D1, D2, D3, and D4; and drives R1 and R2 through a set of connect drivers. The CM 1220 also drives the analog instance 1216. After inserting CM 1220, the receivers R1 1210 and R2 1211 are segregated from drivers D1 1212, D2 1213, D3 1215, D4 1217. Case 9 is a combination of cases 7 and 8. The value of input drivers is resolved by the similar approach described in case 7 and case 8.

The approach described here for Case 9 also applies when the location of the analog instance is in a different hierarchical location. In other words, the analog instance may be attached to the MLMS net at the top.I1, top.I1.I2, or top.I1.I2.I3 sub-levels. In addition, the drivers and receivers may be located at any sub-level in the hierarchy. Moreover, each level of the hierarchy may be a combination of any number of VHDL-AMS and Verilog-AMS modules. The DRS procedures are performed on the MLMS net while maintaining the original functionality.

Note that the above discussion on DRS applies even when the CM is inserted on the VHDL-AMS side. In addition, although the method of the DRS has been described with respect to Verilog-AMS and. VHDL-AMS languages, the method is also applicable for designs that include analog blocks from other languages such as SPICE, HSPICE, Verilog-A, SystemVerilog, SpectreHDL, etc. In other words, the analog instance described above can be a Verilog-AMS analog block, a VHDL-AMS analog block, or an analog block from various languages such as SPICE, HSPICE, Verilog-A, SystemVerilog, SpectreHDL, etc.

The disclosed method of performing DRS in an MLMS design has at least three benefits. First, no wrapper modules are needed to work around the analog-to-digital connections across VHDL-AMS and Verilog-AMS language boundaries. With the disclosed DRS method, a designer can focus on the actual design instead of being consumed by the effort to locate such connections and create wrappers for them. In addition, coercion of domainless nets to support a limited subset of analog-to-digital connections across VHDL-AMS and Verilog-AMS language boundaries is no longer required. With the disclosed DRS method, such connections are supported using automatic or manual insertion of connect modules. Finally, with the ability to work with both Verilog-AMS and VHDL-AMS drivers and receivers on MLMS nets, designs from both Verilog-AMS and VHDL-AMS can be integrated seamlessly to obtain the benefits from both worlds.

One skilled in the relevant art will recognize that there are many possible modifications and combinations of the disclosed embodiments may be used, while still employing the same basic underlying mechanisms and methodologies. The foregoing description, for purpose of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A method for modeling a mixed-language and mixed-signal (MLMS) design, comprising:
   receiving an MLMS design comprising at least a digital driver, a digital receiver, and an analog block connected by an MLMS net in a hierarchical structure;
   identifying analog-digital boundaries of the MLMS design;
   for each analog-digital boundary,
   a) selecting a connect module (CM) by using a predetermined discipline resolution procedure;
   b) determining input driving values of the CM, wherein determining input driving values of the CM includes collecting drivers from a digital segment of the MLMS net, resolving the drivers to create a resolved input driver, and driving a digital port of the CM using the resolved input driver;

c) connecting the digital driver, the digital receiver, and the analog block to the CM; and repeating steps a), b), and c) on all analog-digital boundaries of the MLMS design.

2. The method of claim 1, wherein the hierarchical structure comprises:

one or more hierarchical levels, wherein each hierarchical level comprises one or more Verilog-AMS or VHDL-AMS instances.

3. The method of claim 1, wherein the CM comprises:

a first digital port configured to receive the input drive values from the digital driver;

a second digital port configured to drive the digital receiver based on the input drive values; and a third port configured to drive the analog block based on the input drive values.

4. The method of claim 1, wherein the digital driver is described in a hardware description language.

5. The method of claim 4, wherein the hardware description language is a language selected from the group consisting of Verilog-AMS language, VHDL-AMS language, Verilog-A, SystemVerilog, SpectreHDL, SPICE, and HSPICE.

6. The method of claim 1, wherein the digital receiver is described in a hardware description language.

7. The method of claim 6, wherein the hardware description language is a language selected from the group consisting of Verilog-AMS language, VHDL-AMS language, Verilog-A, SystemVerilog, SpectreHDL, SPICE, and HSPICE.

8. The method of claim 1, wherein resolving the drivers comprising:

representing the MLMS design as a flat digital network and resolving the flat digital network using mixed-language resolution semantics in response to the MLMS design contains only Verilog-AMS drivers;

representing the MLMS design as a hierarchical digital network and resolving the hierarchical digital network using the mixed-language resolution semantics in response to the MLMS design contains only VHDL-AMS drivers; and representing the MLMS design as a second flat digital network and resolving the second flat digital network using the mixed-language resolution semantics in response to the MLMS design contains both VHDL-AMS and Verilog-AMS drivers.

9. The method of claim 8, wherein resolving the hierarchical digital network comprising:

a) traversing the hierarchical digital network level by level in a top-down fashion; and b) resolving input drive values of drivers in a level; and repeating a) and b) until all levels of the hierarchical digital network are resolved.

10. The method of claim 1, wherein resolving the driver further comprising:

collecting drivers within the CM that drive the digital port of the CM;

resolving the drivers to create a resolved connect driver; and driving the digital receivers using the resolved connect driver.

11. The method of claim 1, wherein the CM is selected as a Verilog-AMS or VHDL-AMS instance, and wherein the CM is placed in a predetermined level of the hierarchical structure.

12. The method of claim 1, wherein the analog receiver is a block described by a hardware description language selected from the group consisting of Verilog-AMS, VHDL-AMS, SPICE, HSPICE, and SpectreHDL.

13. A method for simulating a mixed-language mixed-signal (MLMS) design, comprising:

receiving an MLMS design comprising at least a digital driver, a digital receiver, and an analog block connected by an MLMS net in a hierarchical structure;

identifying analog-digital boundaries of the MLMS design;

for each analog-digital boundary, a) selecting a connect module (CM) by using a predetermined discipline resolution procedure;

b) determining input driving values of the CM, wherein determining input drivinn values of the CM includes collecting drivers from a digital segment of the MLMS net, resolving the drivers to create a resolved input driver, and driving a digital port of the CM using the resolved input driver;

c) connecting the digital driver, the digital receiver, and the analog block to the CM;

repeating steps a), b), and c) on all analog-digital boundaries of the MLMS design; and simulating the MLMS design using the CM.

* * * * *